UNITED STATES PATENT OFFICE.

FRANK R. GROUT, OF CHICAGO, ILLINOIS.

SIZING FOR GILDING ON GLASS.

SPECIFICATION forming part of Letters Patent No. 282,629, dated August 7, 1883.

Application filed May 18, 1883. (No specimens.)

*To all whom it may concern:*

Be it known that I, FRANK R. GROUT, of Chicago, Illinois, have invented a new and useful Improvement in Sizing for Gilding on Glass, of which the following is a description.

Great difficulty has heretofore been experienced by sign-painters and gilders having occasion to apply gold and silver leaf to glass and other like surfaces, in being compelled to prepare fresh sizing for each job, in the preparation of which it is essential that the same should be carefully cooked, which requires much time and skill; and inasmuch as the artisan cannot tell with certainty the amount necessary to prepare, he is compelled on each occasion to make a liberal allowance, in order to have sufficient for his work; and, owing to his inability to preserve the residue, the same is wasted and lost. Gilders are often obliged to carry portable stoves or other means for producing heat, in order to prepare fresh material for each job. In view of these facts many painters and gilders are obliged to forego this class of work, owing to their inability to prepare the sizing properly, and to the waste and loss of time occasioned thereby.

My invention has for its object the avoidance of these objections and difficulties by providing a preparation, preferably in a concentrated form, which may be readily carried and used by the artisan, as occasion may require, possessing the qualities of transportability, cheapness, economy, and convenience in use, and imperishability. A further object is to produce such a preparation as may be put up in a convenient merchantable form, and supplied to consumers at a moderate cost.

My improved concentrated sizing consists, preferably, of the following ingredients, combined substantially in the proportions stated, viz: ichthyocolla, or Russian isinglass, in the form known as "long and short staple," two ounces; alcohol or proof-spirit, one-half pint; salicylic acid, one-half ounce; water, seven and one-half pints. I boil the isinglass in the water about one hour, or until it is thoroughly dissolved. Then, after dissolving the salicylic acid in the alcohol, I add the mixture to the glutinous solution. It is preferable to do this while warm, as coagulation of the glutinous matter is thereby avoided and a more perfect mixture produced. As soon as the latter ingredients are added to the former, the solution may be bottled for use.

It is obvious that gelatine, gum-tragacanth, or any fine and transparent glutinous substance may be used instead of that specially named; but long experience and numerous experiments have convinced me that Russian isinglass in any of its forms, and particularly that above named, is more permanent, and tends to give a finer luster or "burnish" to the leaf when applied to the glass.

The alcohol and salicylic acid act as preservatives to the glutinous matter, which would otherwise become sour and rancid.

Bichloride of mercury, camphor, carbolic acid, creosote, oil of cloves, or any of the essential oils may be used as equivalents for the alcohol and salicylic acid, and perhaps with equally good results as preservatives; but some of them—as the bichloride of mercury, for example—might produce injurious effects upon the gold or silver leaf; and as experience has demonstrated the good results attendant upon the use of the preservatives named in the formula, I prefer to adopt them.

In order to deprive the solution of its slightly turbid or cloudy appearance when bottled, and make it more attractive commercially, I recommend the addition of a few drops of water in which eosine has been dissolved, though this does not add to or detract from its virtues as a sizing.

In the use by the artisan of my improved sizing, the best results for gold-leaf may be obtained by pouring about a table-spoonful of the sizing into a pint of water and thoroughly mixing the same, when it should be freely applied to the glass with a camel's-hair brush. For silver-leaf it is best to have the solution somewhat stronger, though care should be taken not to add too much, as it may tend to give the work a "cloudy" appearance, whereas less than the amount stated may permit the leaf to "wash up" while being "patched."

Having thus described my invention, what I claim, and desire to secure by Letters Patent, is—

1. The combination of ichthyocolla, alcohol, and salicylic acid, substantially in the proportions and for the purpose specified.

2. The combination of ichthyocolla, or any glutinous equivalent, with alcohol and salicylic acid, or their equivalents, for the uses and purposes substantially as specified.

3. As a new article of manufacture, the combination, substantially as specified, of Russian isinglass, or its equivalent, with alcohol and salicylic acid, or its equivalent, for the uses and purposes substantially as set forth.

FRANK R. GROUT.

Witnesses:
    D. H. FLETCHER,
    WM. H. DYRENFORTH.